US009064681B2

(12) United States Patent
Swain et al.

(10) Patent No.: US 9,064,681 B2
(45) Date of Patent: Jun. 23, 2015

(54) UV LAMP AND A CAVITY-LESS UV LAMP SYSTEM

(71) Applicants: HERAEUS NOBLELIGHT FUSION UV INC., Gaithersburg, MD (US); CONSIGLIO NAZIONALE DELLE RICERCHE, Rome (IT)

(72) Inventors: Pradyumna Kumar Swain, North Potomac, MD (US); Andrew David Paul Harbourne, Potomac, MD (US); Iginio Longo, Pisa (IT); Carlo Ferrari, Pisa (IT)

(73) Assignees: HERAEUS NOBLELIGHT AMERICA LLC, Gaithersburg, MD (US); CONSIGLIO NAZIONALE DELLE RICERCHE (CNR), Rome (IT)

( * ) Notice: Subject to any disclaimer, the term of this patent is extended or adjusted under 35 U.S.C. 154(b) by 162 days.

(21) Appl. No.: 13/844,387

(22) Filed: Mar. 15, 2013

(65) Prior Publication Data

US 2014/0265830 A1 Sep. 18, 2014

(51) Int. Cl.
*B64C 21/00* (2006.01)
*H01J 65/04* (2006.01)

(52) U.S. Cl.
CPC .................................... *H01J 65/044* (2013.01)

(58) Field of Classification Search
USPC ............. 313/231.31; 315/38.51, 39.69, 39.75
See application file for complete search history.

(56) References Cited

U.S. PATENT DOCUMENTS

| | | | | |
|---|---|---|---|---|
| 6,160,514 | A | 12/2000 | Judd | |
| 6,850,192 | B2 | 2/2005 | Yeh | |
| 7,095,163 | B2 | 8/2006 | Longo | |
| 8,723,419 | B2 * | 5/2014 | Saitou et al. | 315/39.51 |
| 2004/0232358 | A1 | 11/2004 | Moruzzi | |
| 2005/0264215 | A1 | 12/2005 | Briggs et al. | |
| 2009/0206474 | A1 * | 8/2009 | Ferguson et al. | 257/728 |
| 2011/0233424 | A1 | 9/2011 | Rosier et al. | |
| 2011/0253904 | A1 | 10/2011 | NeCamp | |
| 2012/0242223 | A1 | 9/2012 | Espiau et al. | |

OTHER PUBLICATIONS

International Search Report & Written Opinion of the International Searching Authority Application No. PCT/US2014/030615 dated Aug. 19, 2014.

* cited by examiner

*Primary Examiner* — Joseph L Williams
(74) *Attorney, Agent, or Firm* — McDermott Will & Emery LLP

(57) ABSTRACT

A UV lamp includes a UV lamp unit including a tubular bulb and an antenna inserted in the tubular bulb, and an antenna lead for supplying microwave energy from a microwave energy source to the UV lamp unit. The antenna lead includes a bent portion, one end of which is connected to the antenna and the other end is connectable to the microwave energy source.

25 Claims, 6 Drawing Sheets

UV LAMP AND A CAVITY-LESS UV LAMP SYSTEM

TECHNICAL FIELD

This application relates to an ultra violet (UV) lamp, in particular, a cavity-less UV lamp system.

BACKGROUND

FIGS. 1A and 1B show a conventional UV lamp system which employs a cavity. The UV lamp system 10 includes a microwave or RF wave energy source 11, for example, a magnetron, a waveguide 12 and a cavity 13. In the cavity 13, a UV lamp 14 is disposed. In FIG. 1, two UV lamps are arranged in a housing 15.

The microwave energy generated by the magnetron 11 is supplied to the cavity 13 thorough a waveguide 12. Inside the cavity 13, the microwave energy is coupled with the UV lamp 14, and excites one or more elements contained in the UV lamp (for example, Hg), thereby the UV lamp emits UV light including, for example, light of D line wavelength (365 nm).

As shown in FIG. 1B, two UV lamps 14 having a two-inch (5 cm) length are used so as to obtain a wide light irradiation area of about 6-inches (15 cm) in length. However, longer length lamps 14 can be utilized depending on applications of the UV lamp system.

Recently, a new type of UV lamp that does not require a cavity has been developed. For example, U.S. Pat. No. 7,095,163 describes one example of the cavity-less UV lamp. The entire contents of U.S. Pat. No. 7,095,163 are incorporated herein by reference.

FIG. 2 shows a schematic view of the UV lamp disclosed in U.S. Pat. No. 7,095,163. The UV lamp 20 includes a coaxial glass bulb 21 inside of which Hg vapors and Ar gas are enclosed, and an antenna 22 as a microwave coaxial probe. Microwave energy (MW) is supplied through the antenna 22 so as to excite Hg vapor enclosed in the glass bulb 21 to radiate ultra violet (UV) radiation.

However, the UV lamp of U.S. Pat. No. 7,095,163 has several problems. For example, the length of the glass bulb 21 is limited to about λ/4, where λ is a wavelength of the microwave energy. When the wavelength λ is 2.45 GHz, λ/4 is about 3 cm.

Further, as shown in FIG. 2, since the antenna 22 is straight, the arrangement of the UV lamp 20 inside a housing is limited.

The teachings herein alleviate one or more of the above noted problems with a UV lamp including a UV lamp unit and an antenna lead having a bent portion.

SUMMARY

An exemplary UV (ultra violet) lamp of the present disclosure includes a UV lamp unit including a tubular bulb and an antenna inside or surrounded by the tubular bulb, and an antenna lead for supplying microwave energy from a microwave energy source to the UV lamp unit. The antenna lead may include a bent portion, one end of which is connected to the antenna.

In some examples of the UV lamp, the antenna lead may include a coaxial cable having an exposed inner conductor, and the exposed inner conductor may be inside the tubular bulb.

In some examples of the UV lamps, the antenna lead may include a coaxial cable including an inner conductor, insulator, and an outer conductor. A part of the outer conductor may be inside the tubular bulb. The insulator is made of a heat resistant material resistant to heat emitted from the lamp. The heat resistant material may be a ceramic.

In some examples of the UV lamps, the bent portion has an L-shape having a substantially 90° angle, a U-shape, or an S-shape. The L-shape portion may include an elbow joint having a first joint portion and a second joint portion. An end of the antenna lead is connected to the first joint portion, and a coaxial cable, connectable to the microwave energy source, is connected to the second joint portion.

In some examples of the UV lamps, the antenna lead may include a plurality of bent portions.

Further, in some examples of the UV lamps, the tubular bulb may include an inner wall, outer wall and side walls connecting the inner wall and the outer wall, and the inner wall, the outer wall and the side walls constitute an enclosed space. One or more emission elements which absorb the microwave energy and emit UV energy are enclosed in the enclosed space.

An exemplary cavity-less UV lamp system of the present disclosure includes a UV lamp comprising a tubular bulb having a length and thickness smaller than the length, an antenna and an antenna lead, a microwave energy source for supplying microwave energy to the UV lamp, and a housing accommodating the microwave energy source and the UV lamp. The housing may have a light output portion comprising an opening having a major axis. The length of the tubular bulb may be disposed in parallel with the major axis of the opening. The antenna lead may include a first portion extending from the antenna and in parallel to the length of the tubular bulb and a second portion extending substantially perpendicular to the first portion.

The above cavity-less UV lamp system may further include a plurality of UV lamps, and a plurality of microwave energy sources each providing microwave energy to a corresponding UV lamp. The plurality of UV lamps may be arranged along a substantially straight line, or arranged along a same axis.

In some examples of the cavity-less UV lamp systems, two UV lamps may be arranged adjacent each other, and the antenna of each UV lamp may extend in opposite directions. The two antennas extend in directions substantially 180° to each other.

In some examples of the cavity-less UV lamp systems, the microwave energy source may be a magnetron.

Further, in some examples of the cavity-less UV lamp systems, the antenna lead may include a coaxial cable having an exposed inner conductor. The exposed inner conductor may be inserted into the tubular bulb.

In some examples of the cavity-less UV lamp systems, the antenna lead may include a coaxial cable including an inner conductor, insulator, and an outer conductor. The insulator may be made of a heat resistant material resistant to heat emitted from the lamp. The heat resistant material may be ceramic. A part of the outer conductor may be inside the tubular bulb.

In some examples of the cavity-less UV lamp systems, the bent portion may have an L-shape having a substantially 90° angle, a U-shape, or an S-shape. The L-shape portion may include an elbow joint having a first joint portion and a second joint portion. An end of the antenna lead is connected to the first joint portion, and a coaxial cable connected to the microwave energy source is connected to the second joint portion. The antenna lead may include a plurality of bent portions.

In some examples of the cavity-less UV lamp systems, the tubular bulb may include an inner wall, outer wall and side walls connecting the inner wall and the outer wall, and the inner wall, the outer wall and the side walls constitute an enclosed space. One or more emission elements which absorb the microwave energy and emit UV energy are enclosed in the enclosed space.

Additional advantages and novel features will be set forth in part in the description which follows, and in part will become apparent to those skilled in the art upon review of the following and the accompanying drawings or may be learned by production or operation of the examples. The advantages of the present teachings may be realized and attained by practice or use of various aspects of the methodologies, instrumentalities and combinations set forth in the detailed examples discussed below.

DETAILED DESCRIPTION

Figure 1A:
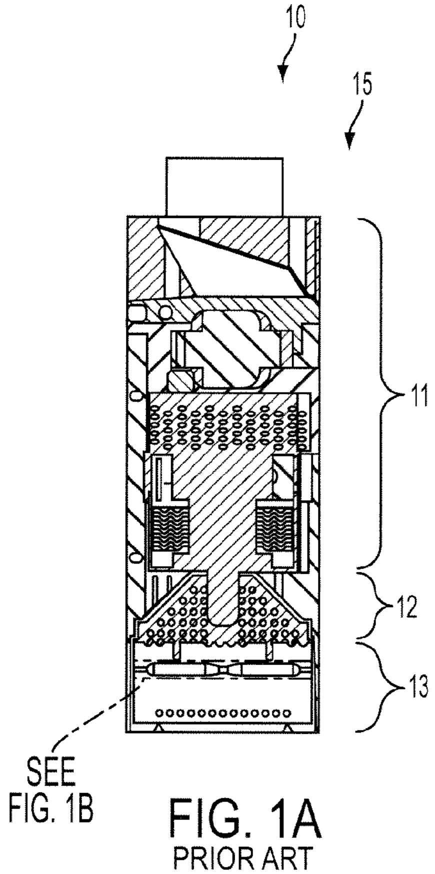
FIG. 1A PRIOR ART
FIGS. 1A and 1B show a conventional UV lamp system.
Figure 1B:
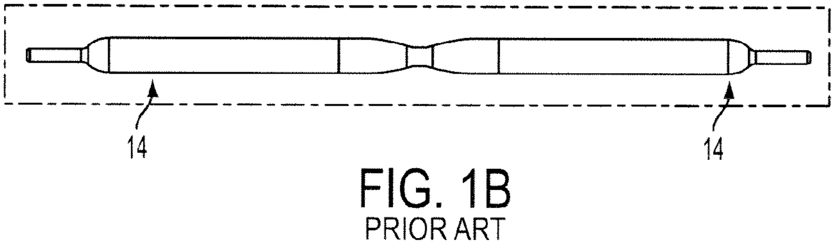
FIG. 1B PRIOR ART
Figure 2:
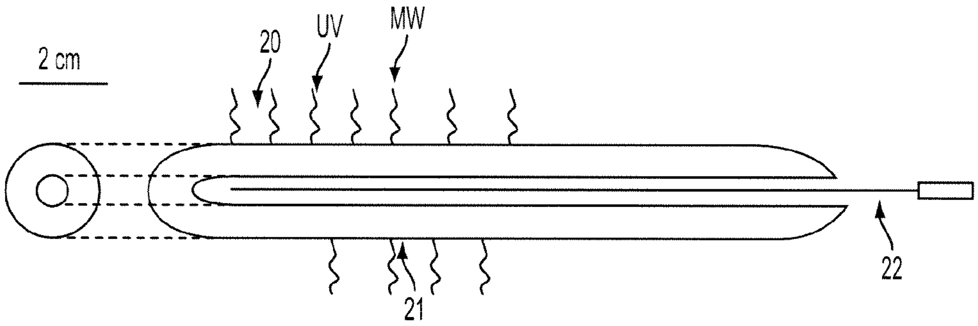
FIG. 2 PRIOR ART
FIG. 2 shows a schematic view of the UV lamp disclosed in U.S. Pat. No. 7,095,163.
Figure 3:
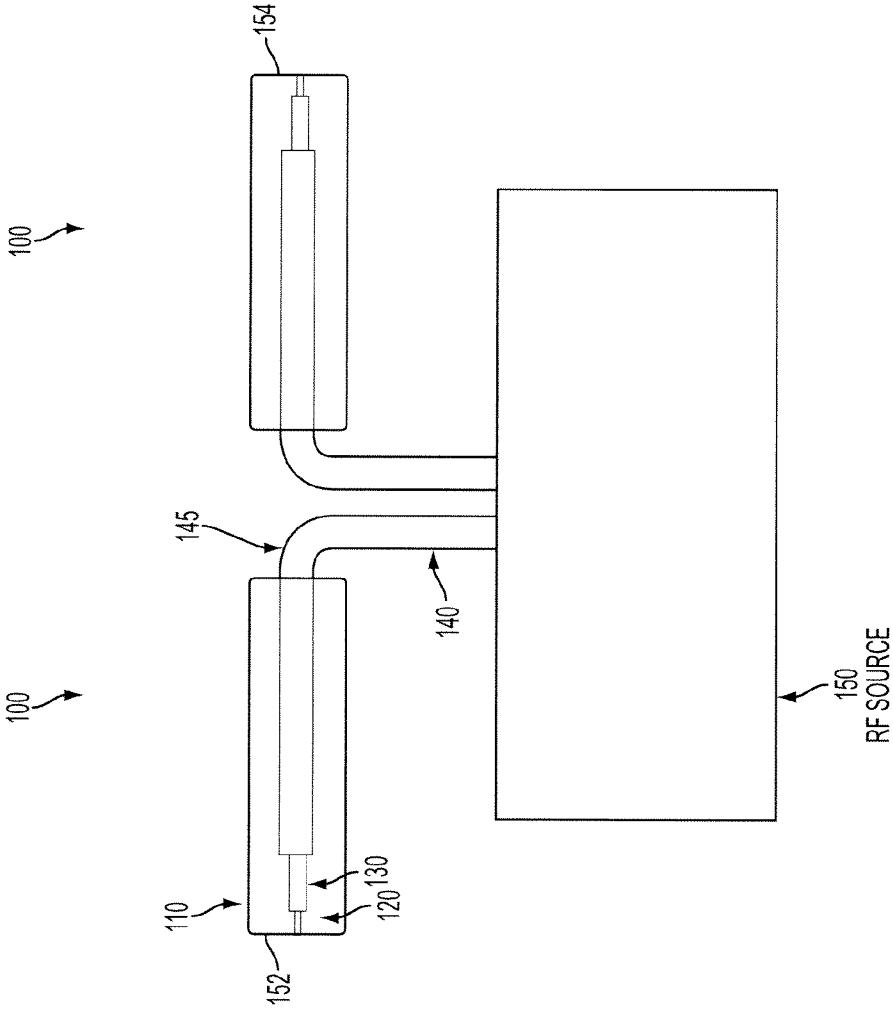
FIG. 3 shows an exemplary schematic view of a UV lamp according to one example of the present disclosure.

FIG. 3 shows an exemplary schematic view of a UV lamp according to the present disclosure. The UV lamp 100 includes a UV lamp unit 110 including a tubular bulb 120 and an antenna 130 inserted in the tubular bulb 120, and an antenna lead 140 for supplying microwave energy from a microwave or RF energy source 150 to the UV lamp unit. In FIG. 3, two UV lamps 100 are shown.

The antenna lead 140 includes a bent portion 145. One end of the bent portion is connected to the antenna 130 and the other end is connected to the microwave energy source 150. Here, the antenna lead 140 is a coaxial cable an inner conductor, insulator and an outer conductor. At the end of the antenna lead 140, the inner conductor is exposed to constitute the antenna 130. The exposed portion (antenna) and a part of the antenna lead in which the inner conductor is not exposed are inserted into the tubular bulb 120.

The bent portion 145 has an L-shape having a substantially 90° angle. The L-shape may be replaced with a U-shape having a round corner. It is noted that "a substantially 90° angle" allows some manufacturing errors or design optimization and may include, for example but not limited to, 85°-95°.

In certain embodiments of the present disclosure, the distance from one end of a first bulb 152 to an end of a second bulb 154 is about 6 inches. Each antenna 120 supplies about 1.5 Kw of microwave power.

Figure 4:
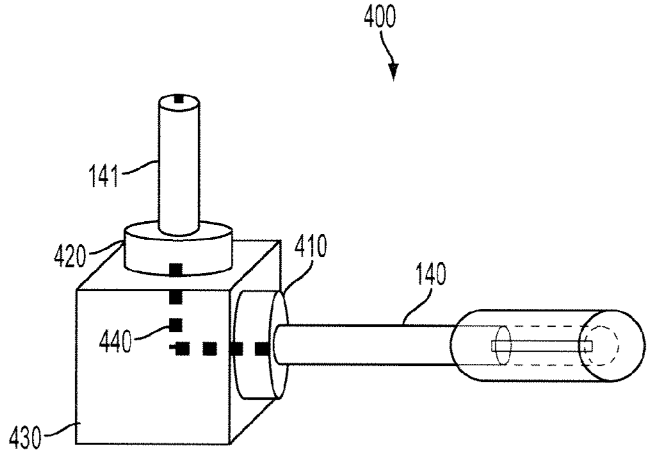
FIG. 4 shows an exemplary schematic view of an elbow joint.

In the present disclosure, the insulator of the coaxial cable is made of a heat resistant material resistant to heat emitted from the lamp, for example, a ceramic. When a ceramic is used as the insulator, it may be difficult to bend the coaxial cable to 90° angle. In such a case, an elbow joint 400 as shown in FIG. 4 can be used. The elbow joint 400 has a first joint portion 410 and a second joint portion 420. The end of the antenna lead 140 is connected to the first joint portion 410 and a coaxial cable 141 connected to the microwave energy source 150 is connected to the second joint portion 420. The inside of the elbow joint body 430 is formed with an insulating material, for example, a ceramic, in which a conductor 440 is embedded. The elbow joint 400 is configured so that, when the coaxial cables 140 and 141 are connected to the elbow joint, the inner conductor of the cables 140 and 141 are connected to each other via the conductor 440.

Figure 5:
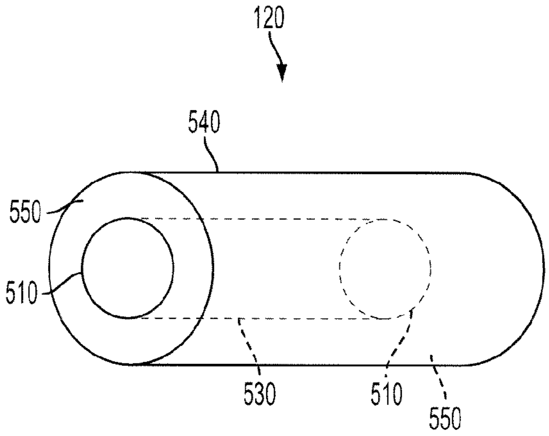
FIG. 5 shows an exemplary schematic view of the tubular bulb.

FIG. 5 shows an exemplary schematic view of the tubular bulb 120. The tubular bulb 120 has open ends 510. The antenna lead 140 is inserted into the tubular bulb from one of the open ends 510. The tubular bulb 120 includes an inner wall 530, outer wall 540 and side walls 550 connecting the inner wall 530 and the outer wall 540. The inner wall 530, the outer wall 540 and the side walls 550 constitute a depressurized enclosed space. One or more emission elements, for example, Hg, which absorb the microwave energy and emit UV energy are enclosed in the enclosed space.

Figure 6:
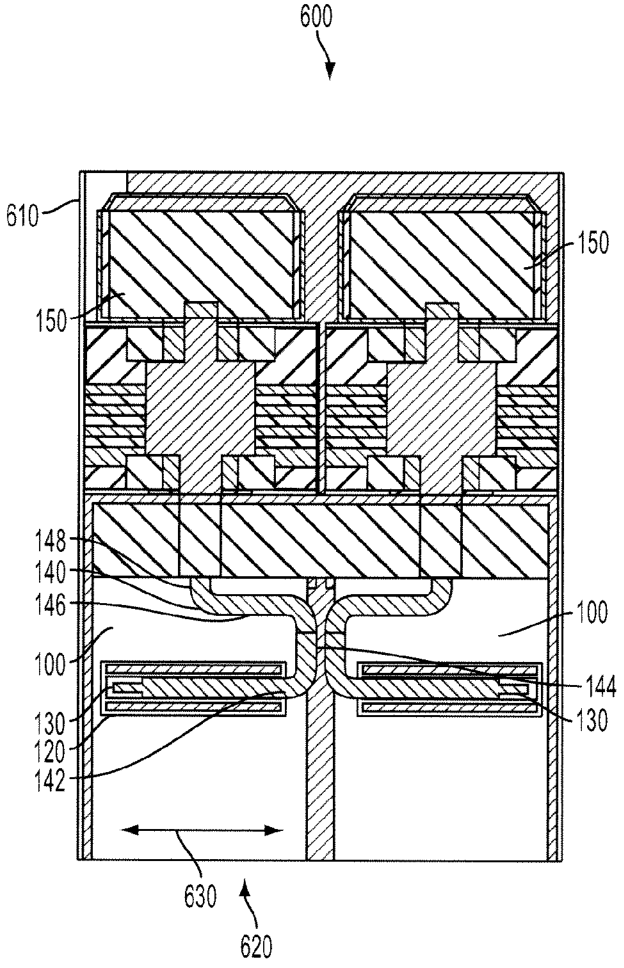
FIGS. 6 and 7 show an exemplary cavity-less UV lamp system according to one example of the present disclosure.
Figure 7:
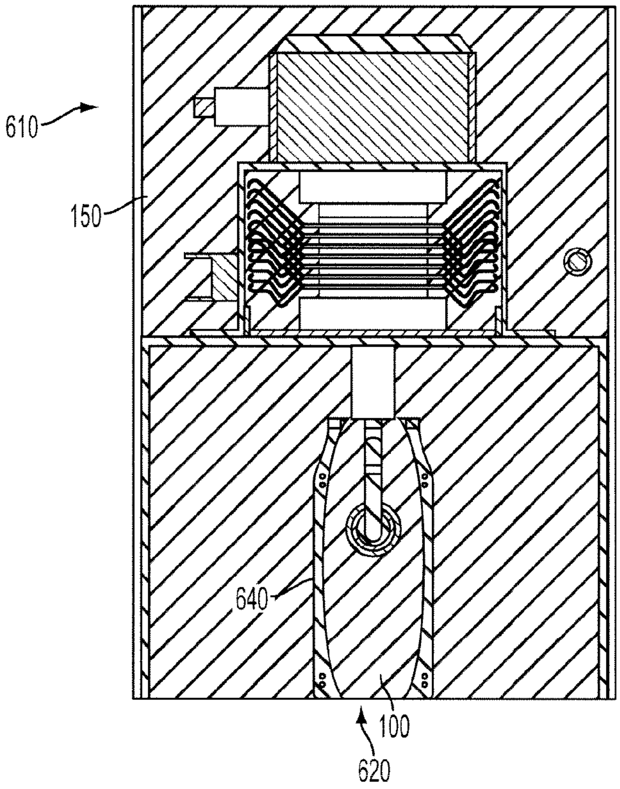

FIGS. 6 and 7 show an exemplary cavity-less UV lamp system 600 according to the present disclosure. FIG. 6 shows a front view and FIG. 7 shows a side view. The UV lamp system 600 does not include a cavity which has been used in the conventional UV lamp system. Instead, the UV lamp system 600 employs the above mentioned UV lamp 100. The lamp system 600 includes a housing 610 accommodating the microwave energy source 150 and the UV lamp 100. The housing 610 has a light output portion including an opening 620 having a major axis 630. In FIG. 6, two pairs of magnetrons 150 and UV lamps 100 are illustrated. A reflector 640 may be disposed inside the housing, as shown in FIG. 7.

The tubular bulb 120 has a length and a thickness smaller than the length. The length of the tubular bulb 120 is disposed in parallel with the major axis 630 of the opening 620, as shown in FIG. 6. The antenna lead 140 includes a first portion 142 extending from the antenna 130 and in parallel to the length of the tubular bulb 120, and a second portion 144 extending substantially perpendicular to the first portion 142. Further, in FIG. 6, the antenna lead 140 includes a third portion 146 extending substantially perpendicular to the second portion 144, and a fourth portion 148 extending substantially perpendicular to the third portion 146 and connected to the magnetron 150, thereby forming multiple bent portions in the antenna lead 140. In some of embodiments of the disclosure, the bent portion includes an S-shape.

As shown in FIG. 6, two UV lamps 100 are arranged adjacent each other, and the antennas 130 of each UV lamp extend in opposite directions. Similarly, the first portions 142 of the antenna lead of each UV lamp extend in opposite directions. Preferably, the two antennas extend in directions substantially 180° to each other. In other words, a plurality of UV lamps are arranged along a substantially straight line, or arranged along a same axis. It is noted that "substantially 180°" allows some manufacturing errors or design optimization and may include, for example but not limited to, 175°-185°.

In FIG. 6, two sets of the UV lamps and the magnetrons are used. In this configuration, it is possible to obtain a wide irradiation area, for example, 80 cm in length. If three or more sets of the UV lamps and the magnetrons are used, larger irradiation areas can be realized.

In certain embodiments, such as the above examples, the microwave frequency of the magnetron is 2450 MHz. However, lower frequencies, for example, 915 MHz may be used. Further, instead of the magnetron, a solid state RF amplifier may be used as an excitation energy source.

With the foregoing configuration, it is possible to flexibly design an UV illumination system. It is also possible to obtain a compact and small UV illumination system.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

We claim:

1. A UV lamp, comprising:

a UV lamp unit including a tubular bulb and an antenna inserted in the tubular bulb; and an antenna lead for supplying microwave energy from a microwave energy source to the UV lamp unit, wherein:

the antenna lead includes a coaxial cable including an inner conductor, insulator, and an outer conductor, the coaxial cable includes a bent portion, one end of which is connected to the antenna and the other end is connectable to the microwave energy source, and a part of outer conductor of the coaxial cable is disposed inside the tubular bulb.

2. The UV lamp of claim 1, wherein:

the inner conductor has an exposed portion of the inner conductor, and the exposed portion is inside the tubular bulb and functions as the antenna.

3. The UV lamp of claim 1, wherein:

the insulator is made of a heat resistant material resistant to heat emitted from the lamp.

4. The UV lamp of claim 3, wherein the heat resistant material is a ceramic.

5. The UV lamp of claim 1, wherein the bent portion has an L-shape having a substantially 90° angle.

6. The UV lamp of claim 5, wherein:

the L-shape portion includes an elbow joint having a first joint portion and a second joint portion, an end of the antenna lead is connected to the first joint portion, and a coaxial cable connectable to the microwave energy source is connected to the second joint portion.

7. The UV lamp of claim 1, wherein the bent portion has a U-shape.

8. The UV lamp of claim 1, wherein the bent portion has an S-shape.

9. The UV lamp of claim 1, wherein the antenna lead includes a plurality of bent portions.

10. The UV lamp of claim 1, wherein:

the tubular bulb includes an inner wall, outer wall and side walls connecting the inner wall and the outer wall, the inner wall, the outer wall and the side walls constitute an enclosed space, and one or more emission elements which absorb the microwave energy and emit UV energy are enclosed in the enclosed space.

11. A cavity-less UV lamp system comprising:

a UV lamp comprising a tubular bulb having a length and a thickness smaller than the length, an antenna, and an antenna lead;

a microwave energy source for supplying microwave energy to the UV lamp; and a housing accommodating the microwave energy source and the UV lamp, wherein:

the housing has a light output portion comprising an opening having a major axis, the length of the tubular bulb is disposed in parallel with the major axis of the opening, and the antenna lead includes a first portion extending from the antenna and in parallel to the length of the tubular bulb and a second portion extending substantially perpendicular to the first portion so as to form a bent portion, the antenna lead includes a coaxial cable including an inner conductor, insulator, and an outer conductor, the coaxial cable includes the first and second portions and the bent portion, and a part of outer conductor of the first portion of the coaxial cable is disposed inside the tubular bulb.

12. The cavity-less UV lamp system of claim 11, wherein two antennas extend in directions substantially 180° to each other.

13. The cavity-less UV lamp system of claim 11, wherein the microwave energy source is a magnetron.

14. The cavity-less UV lamp system of claim 11, wherein:

the first portion of the coaxial cable has an exposed portion of the inner conductor, and the exposed portion is inside the tubular bulb and functions as the antenna.

15. The cavity-less UV lamp system of claim 11, wherein:

the insulator is made of a heat resistant material resistant to heat emitted from the lamp.

16. The cavity-less UV lamp system of claim 15, wherein the heat resistant material is a ceramic.

17. The cavity-less UV lamp system of claim 15, wherein:

the tubular bulb includes an inner wall, outer wall, and side walls connecting the inner wall and the outer wall, the inner wall, the outer wall, and the side walls constitute an enclosed space, and one or more emission elements which absorb the microwave energy and emit UV energy are enclosed in the enclosed space.

18. The cavity-less UV lamp system of claim 11, wherein the bent portion has an L-shape having a substantially 90° angle.

19. The cavity-less UV lamp system of claim 18, wherein:

the L-shape portion includes an elbow joint having a first joint portion and a second joint portion, an end of the antenna lead is connected to the first joint portion, and a coaxial cable connected to the microwave energy source is connected to the second joint portion.

20. The cavity-less UV lamp system of claim 11, wherein the bent portion has a U-shape.

21. The cavity-less UV lamp system of claim 11, wherein the bent portion has an S-shape.

22. The cavity-less UV lamp system of claim 11, wherein the antenna lead includes a plurality of bent portions.

23. A cavity-less UV lamp system, comprising:

a plurality of UV lamps, each comprising a tubular bulb having a length and a thickness smaller than the length, an antenna, and an antenna lead;

a plurality of microwave energy sources each providing microwave energy to a corresponding UV lamp; and a housing accommodating the plurality of microwave energy sources and the plurality of UV lamps, wherein:

the housing has a light output portion comprising an opening having a major axis, the length of the tubular bulb is disposed in parallel with the major axis of the opening, and the antenna lead includes a first portion extending from the antenna and in parallel to the length of the tubular bulb and a second portion extending substantially perpendicular to the first portion.

24. The cavity-less UV lamp system of claim 23, wherein the plurality of UV lamps are arranged along a substantially straight line, or arranged along a same axis.

25. A cavity-less UV lamp system comprising:

two UV lamps arranged adjacent each other, each comprising a tubular bulb having a length and a thickness smaller than the length, an antenna, and an antenna lead;

a microwave energy source for supplying microwave energy to the UV lamps; and a housing accommodating the microwave energy source and the UV lamps, wherein:

the housing has a light output portion comprising an opening having a major axis, the length of the tubular bulb is disposed in parallel with the major axis of the opening, the antenna lead includes a first portion extending from the antenna and in parallel to the length of the tubular bulb and a second portion extending substantially perpendicular to the first portion, and the antennas of the UV lamps extend in opposite directions.

* * * * *